(12) United States Patent
Andersen

(10) Patent No.: US 7,327,388 B2
(45) Date of Patent: Feb. 5, 2008

(54) METHOD AND APPARATUS FOR PRODUCING A HIGH RESOLUTION IMAGE

(75) Inventor: Steen Ørsted Andersen, Roskilde (DK)

(73) Assignee: DeltaPix ApS, Måløv (DK)

( * ) Notice: Subject to any disclaimer, the term of this patent is extended or adjusted under 35 U.S.C. 154(b) by 737 days.

(21) Appl. No.: 10/797,375

(22) Filed: Mar. 9, 2004

(65) Prior Publication Data

US 2004/0169735 A1 Sep. 2, 2004

Related U.S. Application Data

(63) Continuation of application No. PCT/DK02/00589, filed on Sep. 11, 2002.

(30) Foreign Application Priority Data

Sep. 11, 2001 (DK) ................................ 2001 01326

(51) Int. Cl.
*H04N 5/225* (2006.01)
(52) U.S. Cl. .................................................. 348/219.1
(58) Field of Classification Search ............... 348/219.1
See application file for complete search history.

(56) References Cited

U.S. PATENT DOCUMENTS

| 4,652,928 A | 3/1987 | Endo et al. ................ 358/213 |
| 5,023,921 A | 6/1991 | Goutte et al. .................. 382/58 |
| 5,214,513 A * | 5/1993 | Lee ........................ 348/207.99 |
| 5,754,226 A | 5/1998 | Yamada et al. ............. 348/219 |
| 6,115,147 A | 9/2000 | Mizumoto et al. .......... 358/483 |

FOREIGN PATENT DOCUMENTS

| DK | 2768/89 A | 12/1989 |
| EP | 0 748 108 A2 | 12/1996 |
| WO | WO 97/12483 | 4/1997 |
| WO | WO 01/43426 A1 | 6/2001 |

\* cited by examiner

*Primary Examiner*—Ngoc-Yen Vu
*Assistant Examiner*—Adam L Henderson
(74) *Attorney, Agent, or Firm*—Winston & Strawn LLP

(57) ABSTRACT

A method and apparatus serves for converting a low resolution first image to a high resolution second image. The apparatus is includes a light sensor for receiving incident light radiated from a scene. The light sensor has a number of cells, each defining a predetermined area, and is arranged for cyclically scanning the low resolution first image a number of times while at least one driver moves the light sensor an identical number of times in at least one direction. For each step the light sensor is moved a distance corresponding to the extent of the area covered by the cell in the direction of movement while the total distance covered corresponds to the extent of the cell in the movement direction. Thereby a number of subareas are defined. A computer serves to establish a representation of the high resolution second image by calculating the representation of the received incident light from the scene at each subarea by software program. Thereby, a higher resolution and a better image quality is obtained than previously known.

17 Claims, 11 Drawing Sheets

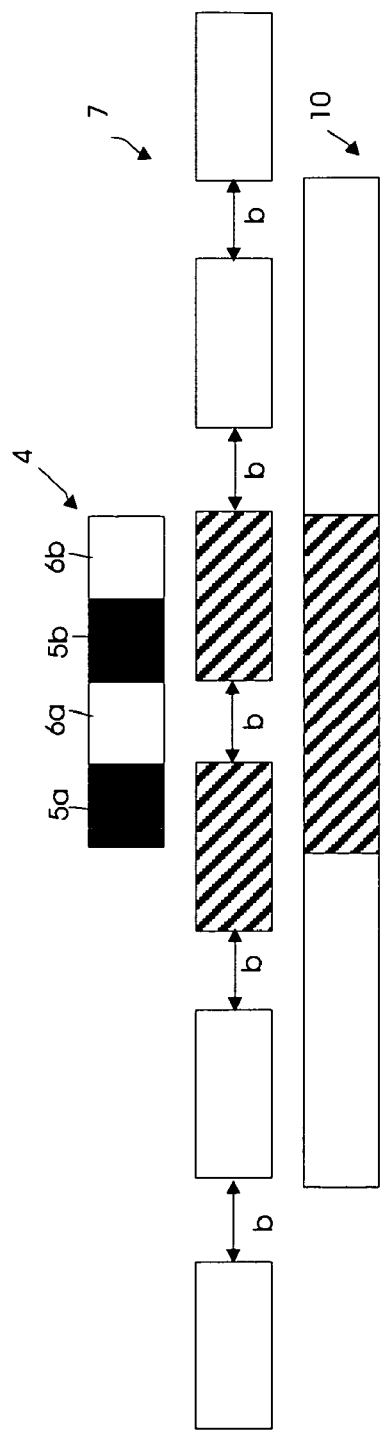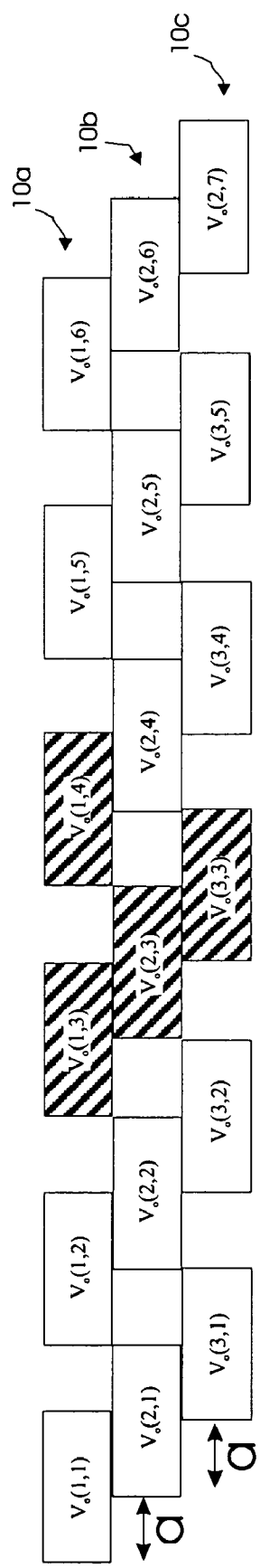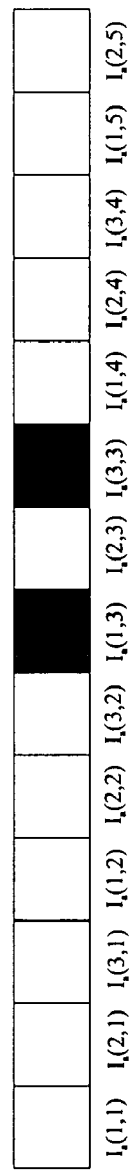

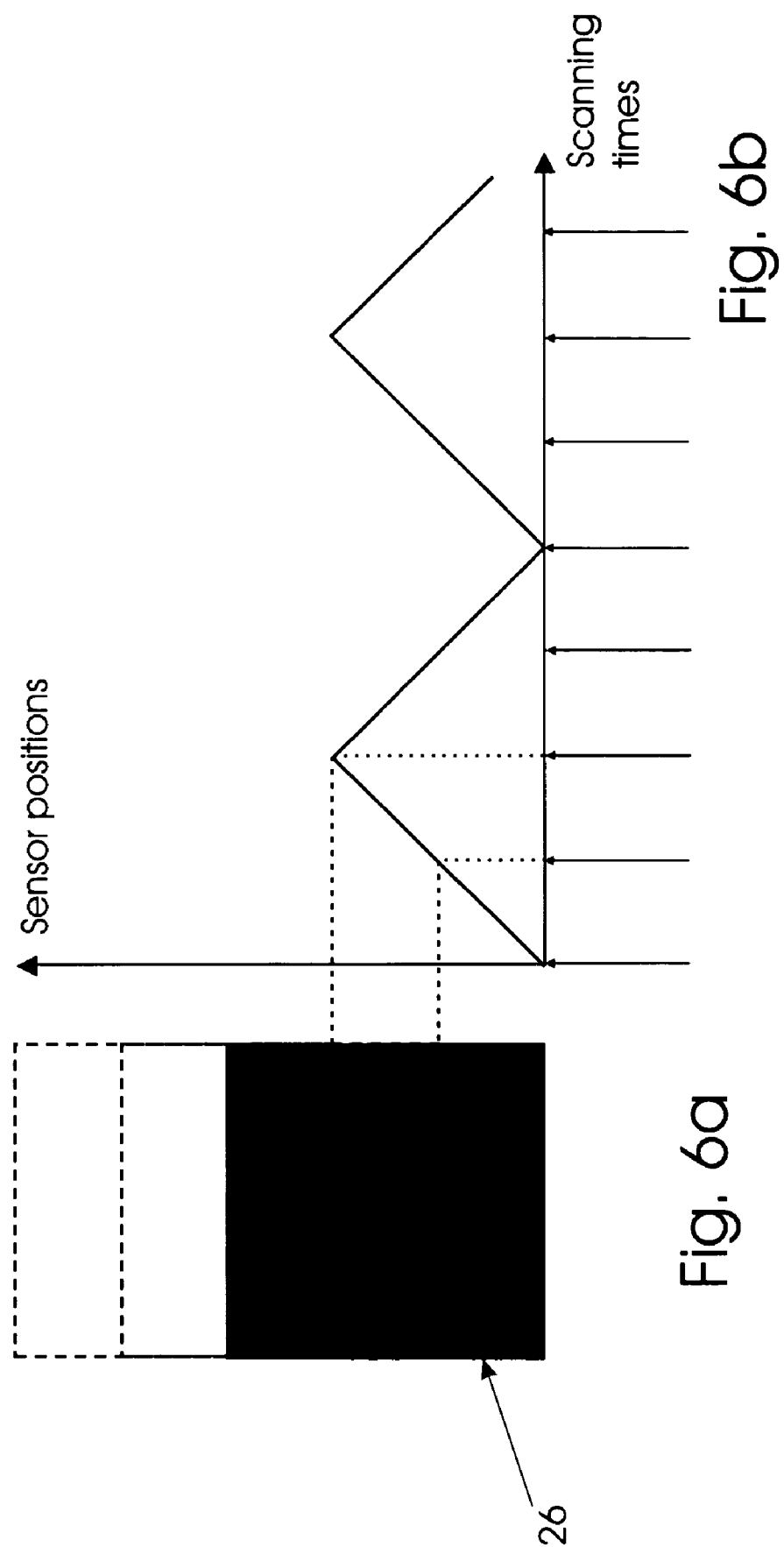

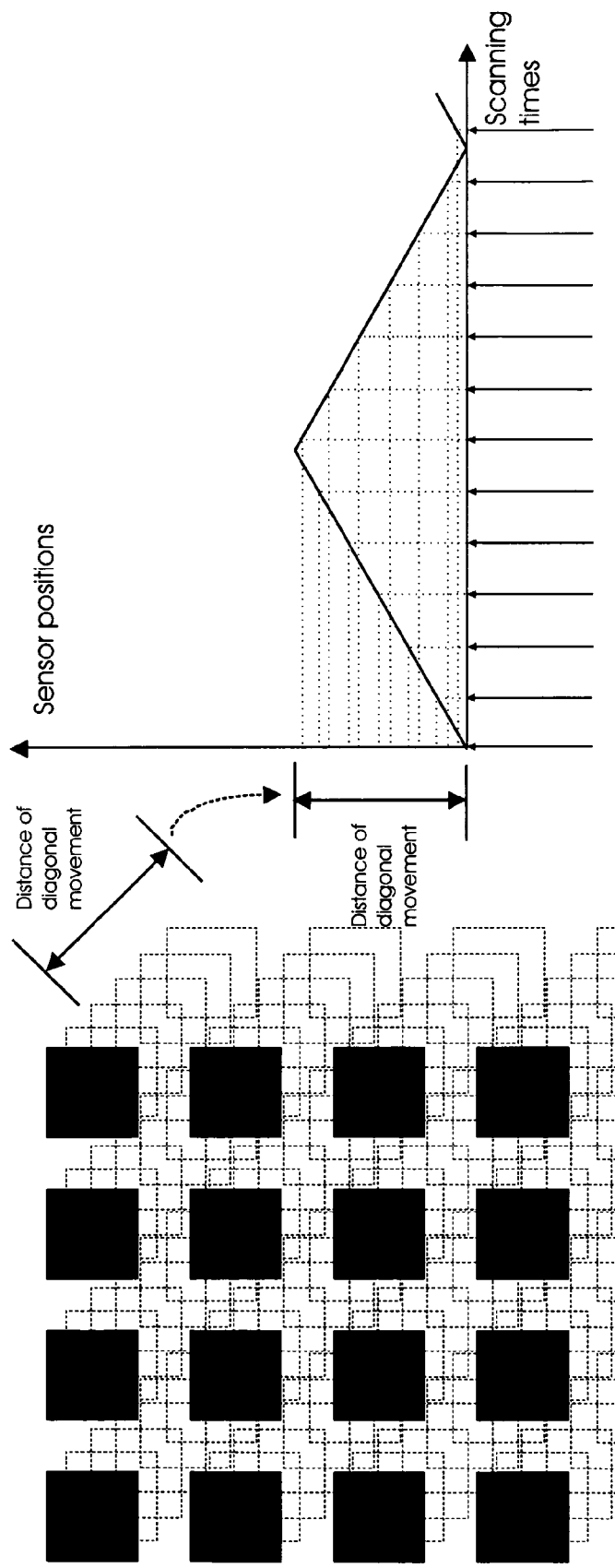

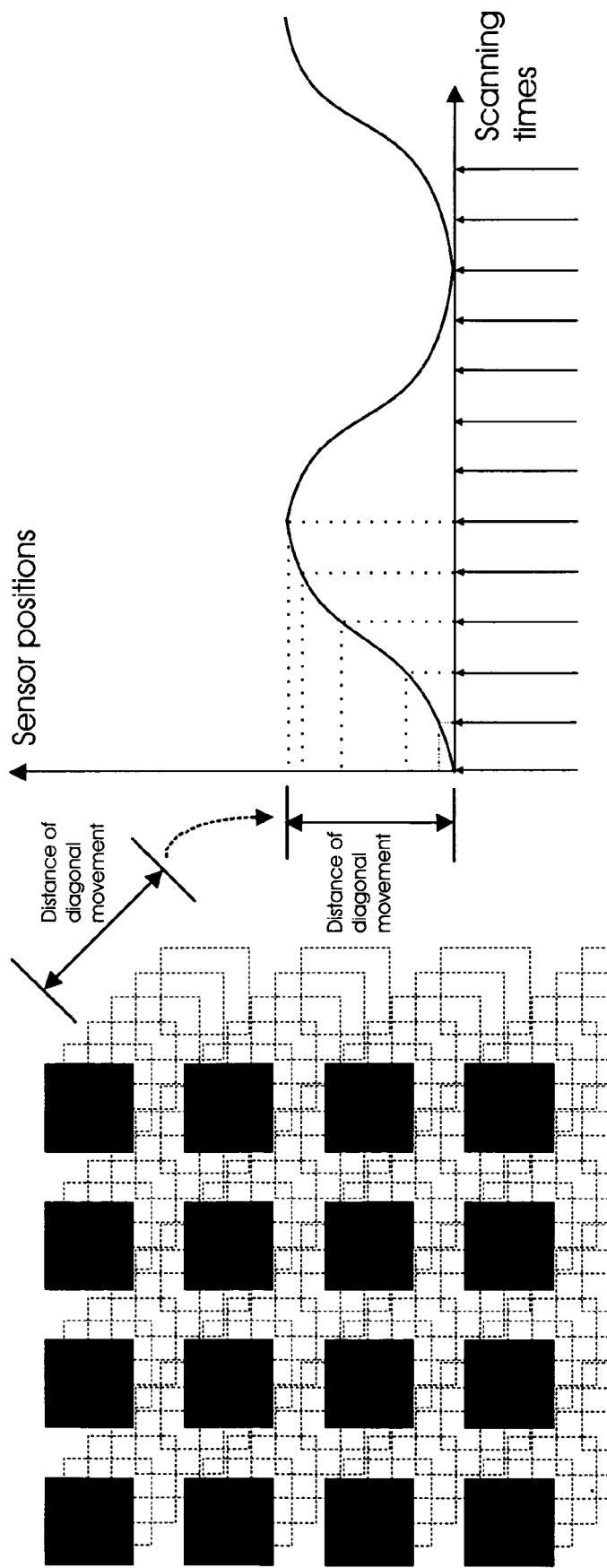

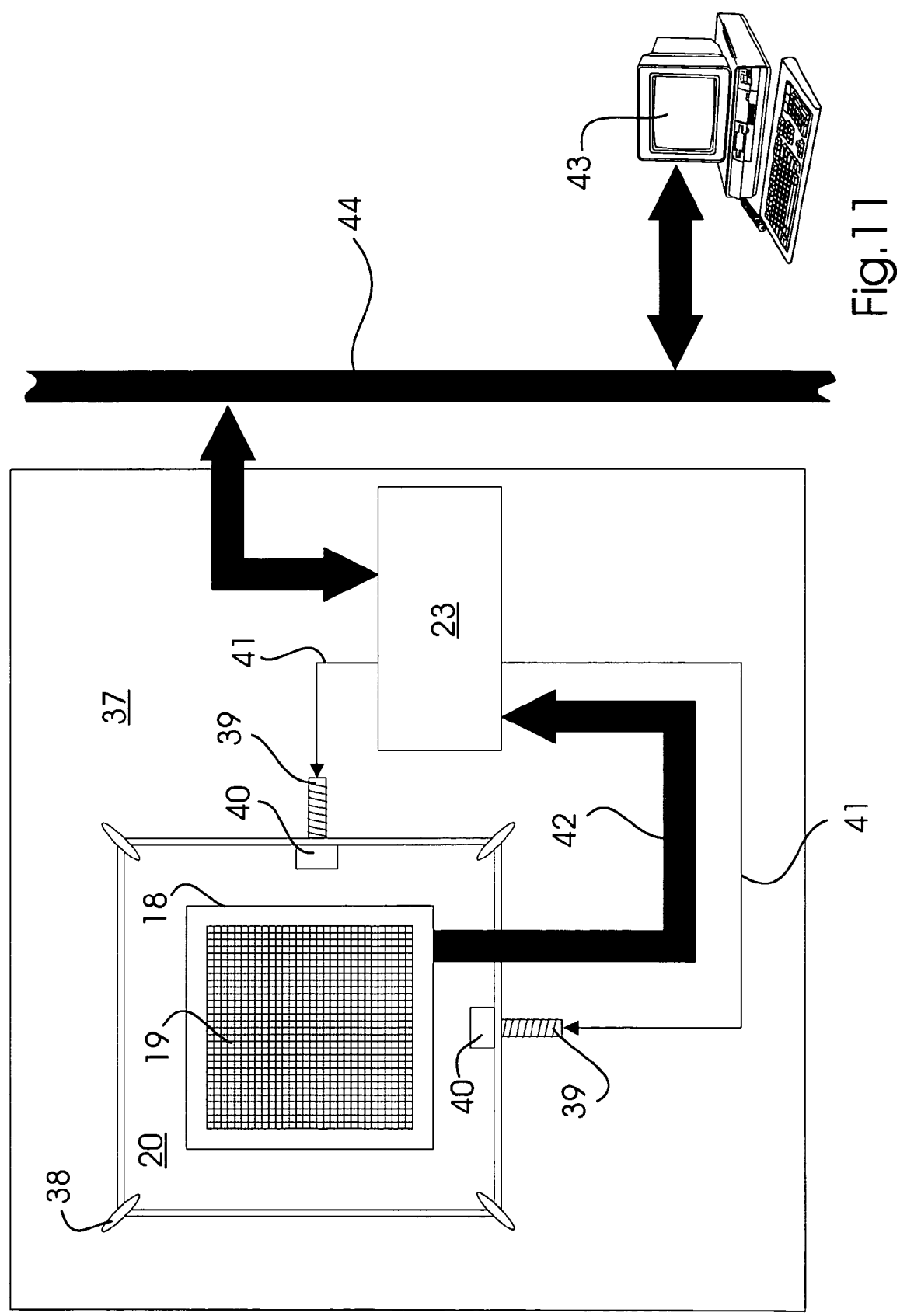

METHOD AND APPARATUS FOR PRODUCING A HIGH RESOLUTION IMAGE

CROSS-REFERENCE TO RELATED APPLICATIONS

Figure 1:
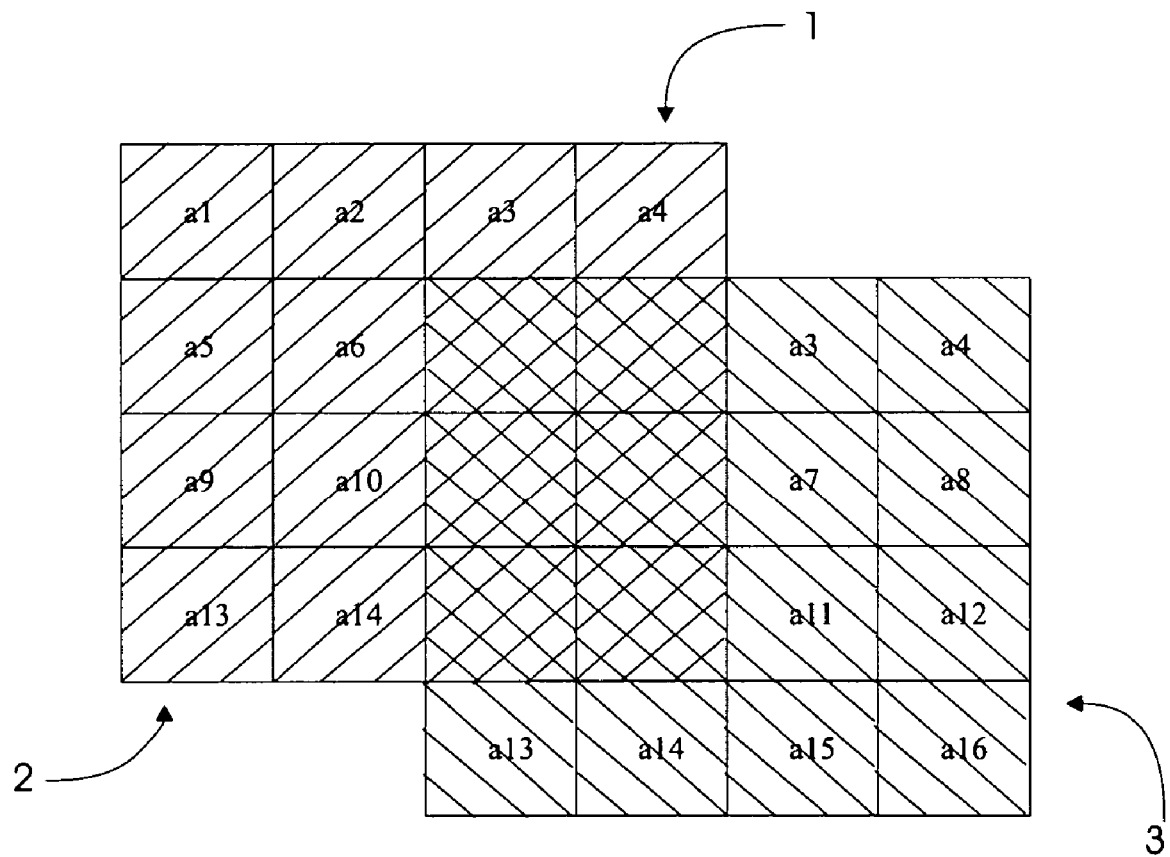

This application is a continuation of International Application PCT/DK02/00589 filed Sep. 11, 2002, the entire content of which is expressly incorporated herein by reference thereto.

BACKGROUND ART

The present invention relates to a method and an apparatus for producing a high-resolution image.

Solid state imaging devices such as CCDs (Charge Coupled Devices) or C-MOS arrays consisting of imaging surfaces, with pixels arranged in a one or two-dimensional matrix are widely used in digital cameras and scanners.

There is however a growing demand for higher resolution of the images. One way of obtaining a higher resolution is by increasing the number of pixels in the imaging surface of solid state imaging devices. However, if the number of pixels is simply increased in e.g. a CCD to satisfy the need for high resolution, its chip size has to be further increased. On the other hand, in order to increase the number of pixels without changing the present CCD chip size, the integration of pixels must be greatly enhanced. It is technically difficult to prepare such a high-density CCD. Even if development of improved fabrication techniques allows the manufacture of such a CCD in the near future, the circuit configuration for driving such a CCD becomes complicated and power consumption becomes higher, thus entailing new problems, which will result in loss of production efficiency and higher cost.

Other methods for obtaining higher resolution have been used. In scanners the CCD or CMOS array are usually moved in one direction in steps equal to the height of the individual sensors by means of stepper motors, and in special high resolution cameras, the sensor matrix are moved in both an X and an Y directions, to move the individual cells to positions not covered by any cell in the matrix (due to a physical distance between each sensor) or to positions not covered by either a red, green or blue filtered cell. All methods have the limitation that the area of each sensor-cell is limiting the achievable resolution.

In many of these systems, a higher resolution is "simulated" by the use of so-called "sharpening" filters, which digitally amplify high frequency components. These filters are so-called "Finite Impulse Response" (FIR) filters, which only amplify those frequencies limited by the above mentioned sensor-cell area, and thereby only increase those high frequency components, that have already passed the limitations of the system anyway.

U.S. Pat. No. 6,002,810 disclose a method for generating an image having an arbitrary number of pixels starting from a given digitally image having a given number of pixels. This method does not provide a means for improving the resolution and the quality of the image after enlarging will be inferior to the original.

U.S. Pat. No. 4,652,928 relate to a method for improving the actual resolution of an image at the time the image is being established. However, the improvement of the resolution is limited by a factor 2 and is effected solely upon movement in a horizontal direction. Moreover, as already mentioned the achievable resolution is limited by the size of the sensor-cells.

WO 97/12483 discloses an array of CCD cameras, which by means of micro-motion mechanisms moves the array such that a number of images are scanned, thereafter the images are combined to form one high-resolution image. It does not, however, disclose a technical solution to create a high-resolution image from the scanned images.

U.S. Pat. No. 5,754,226 discloses a method to generate a high-resolution image based on a number of displaced low-resolution images. However the accuracy of the method requires that no frequency components above 1/Ph occur to avoid aliasing. To efficiently remove frequencies above 1/Ph a birefringence plate is used which both increases the costs and by removing frequencies above 1/Ph in the low-resolution image also excludes the possibility to regenerate information above this frequency in the high-resolution image.

SUMMARY OF THE INVENTION

The present invention now provides a new and improved method and apparatus that are capable of attaining higher resolution and realizing better image quality at a lesser cost than for currently known devices and methods.

According to the invention, a low resolution first image is converted to a high resolution second image by means of a light sensor for receiving incident light radiated from a scene, whereby the light sensor is constructed as an array or a matrix having a number of cells, each defining a predetermined area.

The method for carrying out this conversion comprises scanning the first image cyclically a number of times, and moving the light sensor simultaneously with the scanning stepwise an identical number of times relative to the light radiating scene in at least one direction, thereby defining a number of subareas, with the total distance covered during movement of the light sensor corresponding to the extent of the cell or to the extent of the cell plus a distance defined by or to the neighbor cell in the at least one movement direction. A representation of the high resolution second image is thus established by calculating the representation of the received incident light from the scene at each subarea.

In this method, the calculations are limited to a minimum but the image resolution is only limited by factors such as the optics and the precision of the positioning mechanism rather than by the number or size of each sensor cell. This provides the user with the possibility of achieving an extremely high resolution which far surpasses that known by any other conventional method.

BRIEF DESCRIPTION OF THE DRAWING FIGURES

Figure 2A:
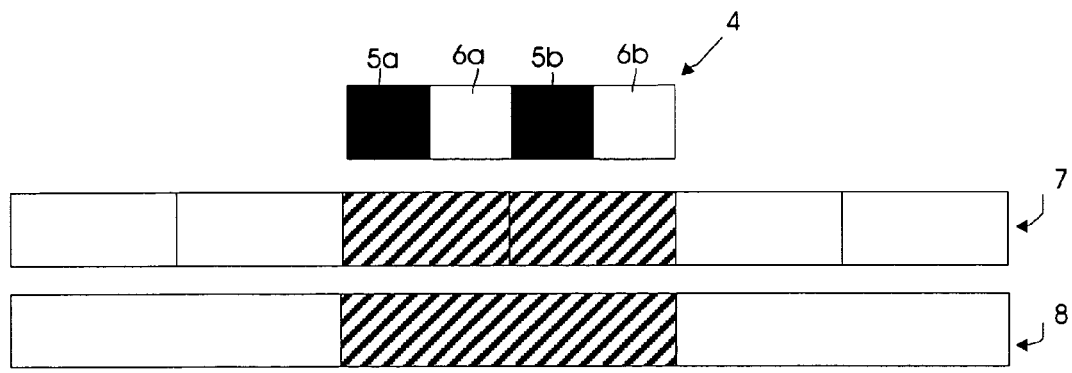
Figure 2B:
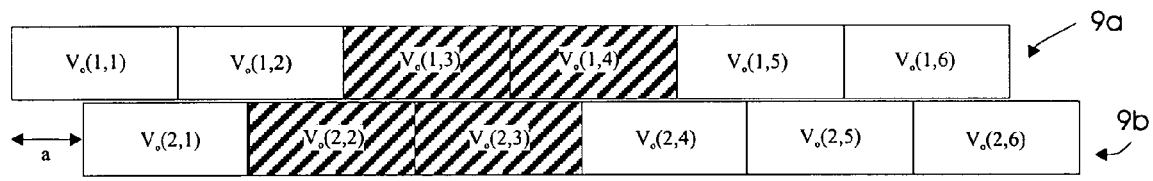
Figure 2C:
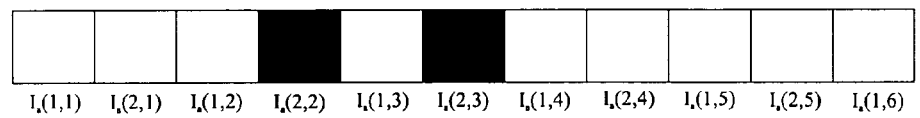
Figure 4:
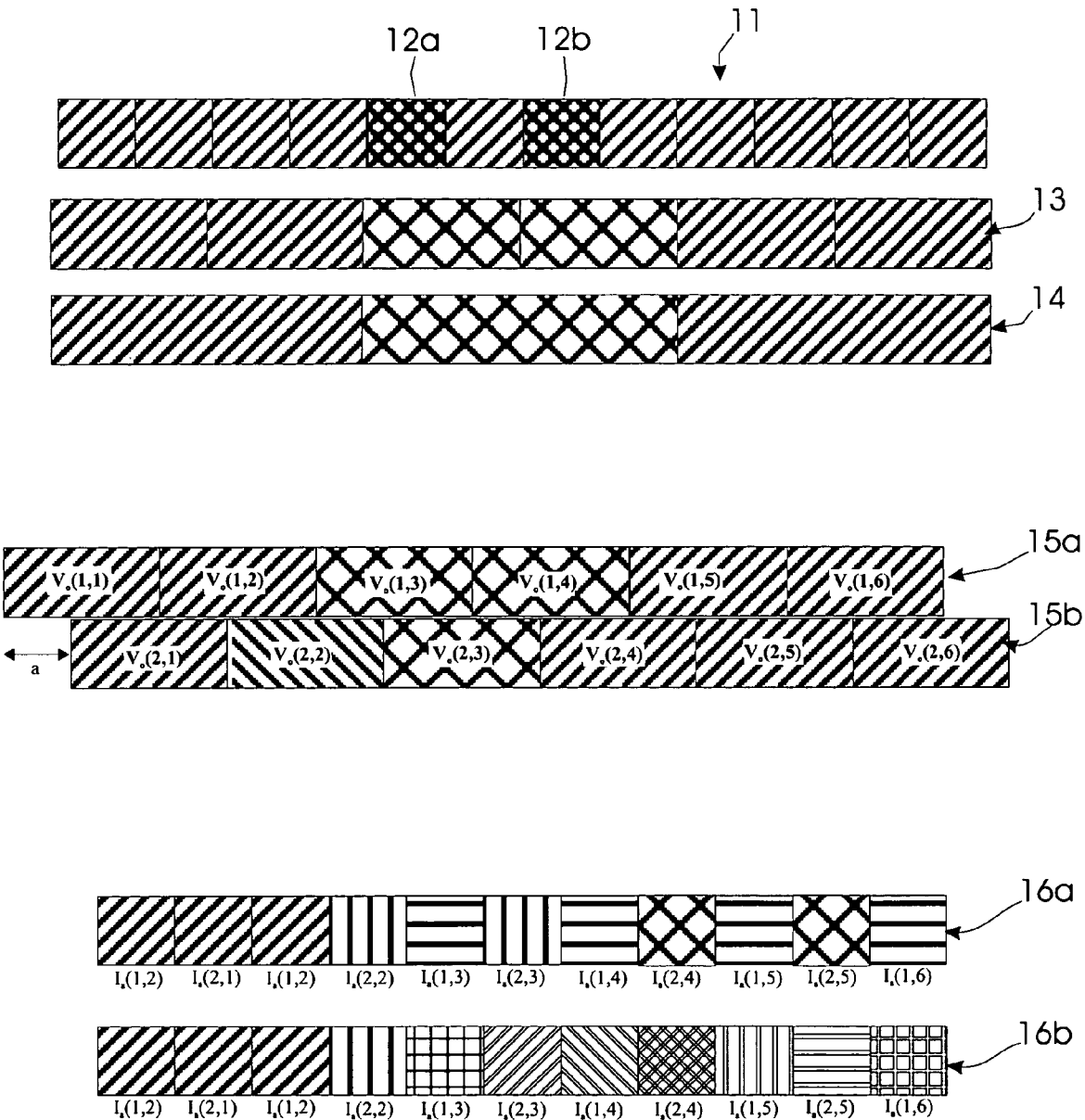
Figure 5:
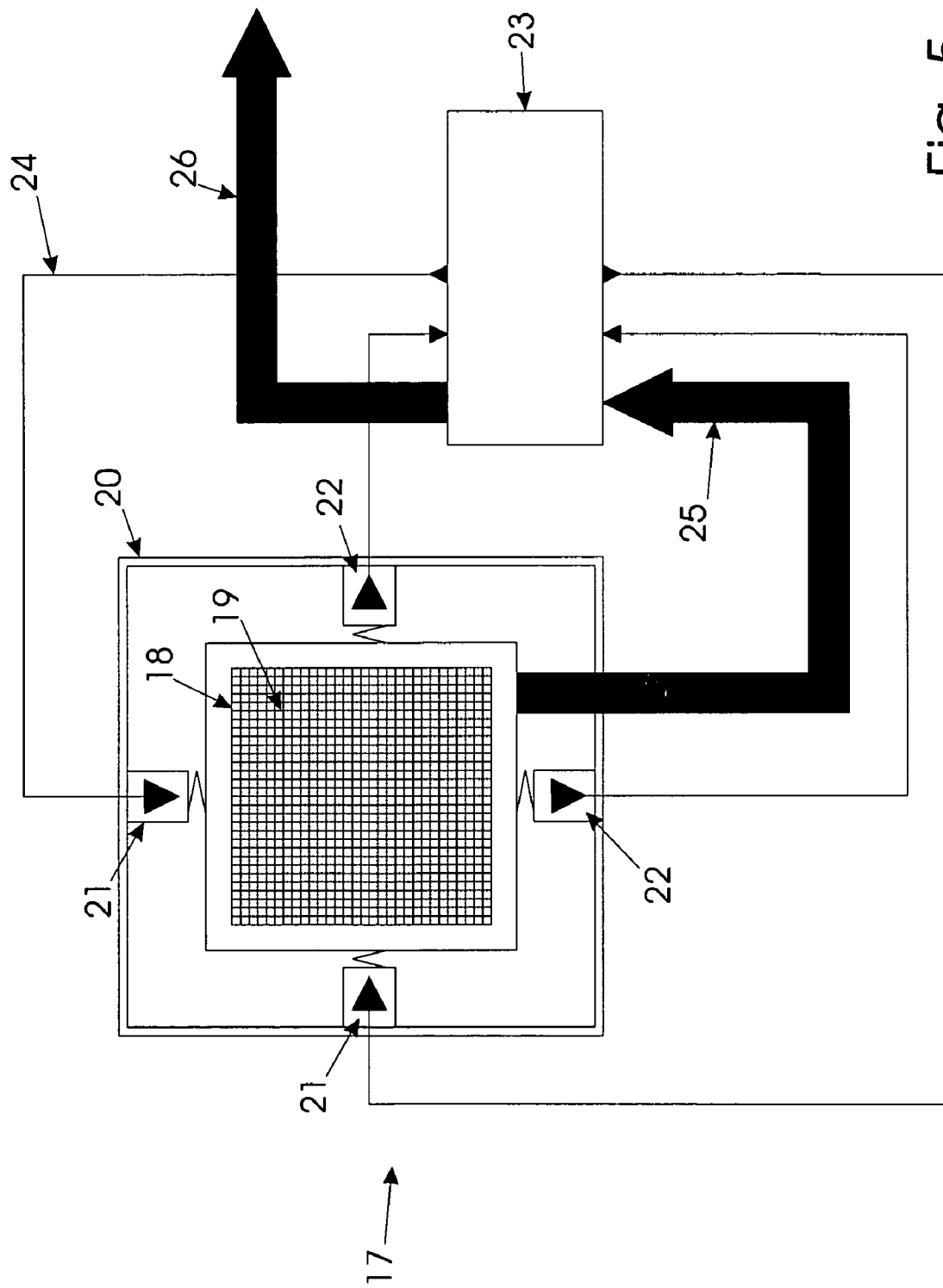
Figure 9B:
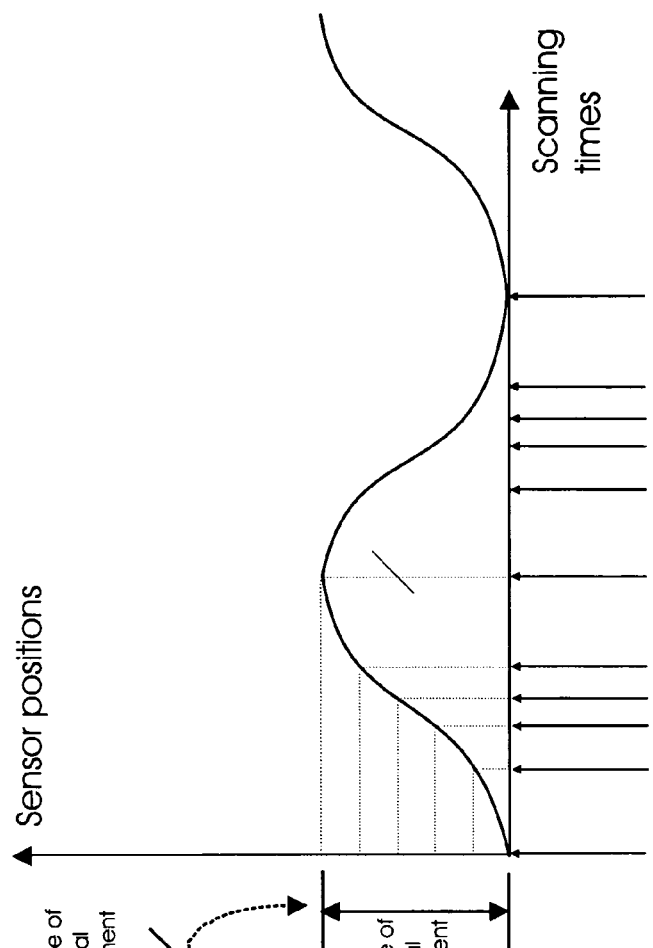
Figure 9A:
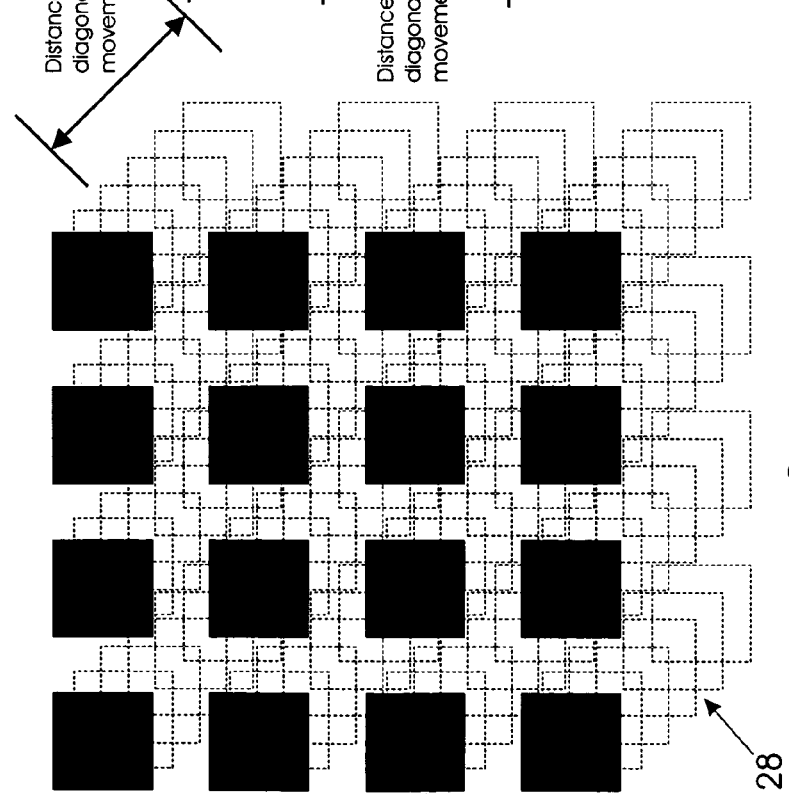

The invention will be explained in greater detail below, describing only simple idealized exemplary embodiments with reference to the drawing, in which:

FIG. 1 shows a sensor cell according to the invention with a matrix 16 subareas a in a first and second position, FIG. 2a-2c is illustrating the method according to the invention in a matrix with one cell-array, FIG. 3a-3c is illustrating the method according to the invention in a matrix with one cell-array but were there is a physical distance between the cells in the sensor, FIG. 4 is illustrating the method according to the invention in a matrix with one cell-array, but where the influence of an error is minimized by means of a filter according to the invention, FIG. 5 shows schematically an apparatus according to the invention, FIG. 6a-6b shows schematically one embodiment of the invention, FIG. 7a-7b shows schematically another embodiment of the invention, FIG. 8a-8b shows schematically a third embodiment of the invention, FIG. 9a-9b shows schematically a fourth embodiment of the invention, FIG. 10a-10c shows a fifth embodiment of the invention in form of a scanner, and FIG. 11 shows schematically a sixth embodiment of the invention.

DETAILED DESCRIPTION OF THE PREFERRED EMBODIMENTS

The calculations representing the received incident light from the scene at each subarea is advantageously performed by means of a computer having a software program for receiving the output from the position sensor and on basis of this output calculate control values for bringing the light sensor to move in a wanted way. If the light sensor for each step is moved a distance corresponding to the extend of the area covered by the cell in the direction of movement, divided with the number of scanning times it is possible, due to the overlapping between scannings, to have several scannings on the same cell whereby the calculations in the cycle and thus the resolution will become even more accurate.

By an advantageously embodiment according to the invention the light sensor can be stepwise moved by means of at least one driver relative to the light radiating scene, the immediate position of the light sensor can be recorded by means of at least one position sensor generating output representing said sensor position, said output can be send to a computer having a software program for calculating control values on basis of the received output, and signals representing the calculated control values can be send to the at least one position driver for bringing this to drive the light sensor in such a way that the steps of movement as function of the scannings defines a predetermined curve in a coordinate system.

This predetermined curve can have any appropriate form such as a stairway or sinusoidal pattern. Another preferred form is a triangle. By choosing a triangle curve the scannings can be performed with equidistant timely distances while the distance between the positions of the light sensor are maintained exactly the same.

In practice, the light sensor can be movable mounted on a frame and cyclically moved along this by means of the drivers simultaneously with scanning the low resolution first image a number of times by means of an activator bringing the light sensor to scan.

The values calculated after all predetermined number of scannings can advantageously be computed by means of the following formula:

$$I_a(z)=V_o*A/a(n)-\Sigma I_a(n) \text{ for } n=1 \text{ to } a=N, n \neq z \qquad (1)$$

where:
N is the number of subareas into which each cell is split,
n is the index for subareas in the sensor cell,
a is the area of the n'th subarea of the sensor cell,
$V_o$ is the output signal from the sensor cells,
$I_a$ is the computed light radiation received by the subarea a,
z is the subarea to be calculated, and
A is the total area of the sensor cell.

This formula is based on the assumption that the output from each imaging surface of the individual sensor cells arranged in a two-dimensional matrix is in principle a representation of the integration of the light intensity on the area of the optical sensor elements:

$$V_o = \int I_a(a)da.$$

and when there is a definite number of subareas a in A, is the formula:

$$V_o = \Sigma I_a(n) \text{ for } n=1 \text{ to } N,$$

where:
N is the number of subareas into which each cell is split,
n is the index for subareas in the sensor cell,
$V_o$ is the output signals from the sensor cells, and
$I_a$ is the computed light radiation received by the subarea a.

The larger the sensor element, the larger $V_o$ will be. It is necessary, however, that $V_o$ be independent of the area of the sensor, since a given light intensity always must represent the same $V_o$. Therefore, $V_o$ is scaled in accordance with the pixel area, so that:

$$V_o = \Sigma I_a(n) \text{ for } n=1 \text{ to } N, =>$$

$$V_o = (1/A)*\Sigma I_a(n)*a(n) \text{ for } n=1 \text{ to } N,$$

where a(n) is the area of the n'th subarea.

This will of course happen automatically in the sensor via exposure time and related technique in the sensor, but the assumption is important for arriving to formula (1).

$I_a$ for a given subarea z is therefore:

$$I_a(z)=V_o*A/a(z)-\Sigma I_a(n) \text{ for } n=1 \text{ to } n=N, n \neq z \qquad (2)$$

where:
N is the number of subareas into which each cell is split,
n is the index for subareas in the sensor cell,
a is the area of the n'th subarea of the sensor cell,
$V_o$ is the output signals from the sensor cells,
$I_a$ is the computed light radiation received by the subarea a,
z is the subarea to be used for calculation, and
A is the area of the sensor cell.

If all subareas have equal area, then A/a(z)=N and (1) can be written:

$$I_a(z)=V_o*N-\Sigma I_a(n) \text{ for } n=1 \text{ to } n=N, a \neq z \qquad (3)$$

The formula in (1) can in general work for any subarea in the entire sensor matrix, meaning that the summation of subareas can cover subareas from other sensor cells:

$$I_a(z)=V_o*A/a(z)-\Sigma I_a(n) \text{ for } n=1 \text{ to } n=N, n \neq z \qquad (4)$$

where:
N is the number of subareas that the summation includes,
n is the index for subareas to be summarized,
a is the area of the n'th subarea,
$V_o$ is the output signal from one of the sensor cells, which includes the subarea a(z),
$I_a$ is the computed light radiation received by the subarea a,
z is the subarea to be used for calculation, and
A is the area of the entire subareas.

Since the method according to the invention is based on calculated values, or in some instances on estimated values, there will inevitably be generated errors in the calculations. The formula in (4) mathematically describes a digital "Infinite Impulse Response" (IIR) filter as it reuse previously calculated values. Since these filters may oscillate if they are triggered by errors, the filter in formula (4) will in practical implementations have to be slightly modified or followed by another digital filter. Typically this other filter can also be described by the formula in (4).

In a preferred embodiment, the method comprises a digital filter for minimizing the errors. The digital filter can e.g. use several values from several different set of input values and the set of previous calculated output values to compute a new output value. This will minimize the influence from errors in calculated values or errors in an output value from a sensor cell. Different types of filters can be used, but the most simple type is based on the formula in (2), where each factor on the right side is weighted with a predetermined value.

In a more advanced implementation, these weighting factors will be adaptive, meaning that the filter characteristics changes based on the content of high frequency components in the part of the image of the light radiating scene where it is actually working.

In one embodiment of the invention is it assumed that the light sensor is formed as a X,Y-matrix, with respectively X*Y cells. When the sensor has been moved to a N number of new positions and a N number of sets of output values from the sensor has been stored, a new $X_S, Y_T$-matrix with $X_S*Y_T$ cells can be calculated. The new matrix having a row of X*S cells and a column of T*Y cells, giving N<=S*T, and the digital filter as a modification of formula (3) can be written in the form:

$$I_a(x_s, y_t) = F_v * V_o(x, y) - \Sigma I_a(x_s-n, y_t-m) * F(x_s-n, y_t-m) \quad (4)$$

for n=1 to n=$x_s$ and m=1 to m=$y_t$; (n,m)≠($x_s, y_t$)

where:

$I_a(x_s, y_s)$ is the light radiation value of the $x_s, y_t$ element in the new $X_S, Y_T$ matrix to be calculated, $V_o(x,y)$ is the sensor output value from the sensor element in the chosen scanning position covering the ($x_s, y_t$) subarea, $F_v$ is the predetermined filter coefficient related to the sensor output value from the sensor element in the chosen scanning position covering the ($x_s, y_t$) subarea, $I_a(x_s-n, y_t-m)$ is previous calculated $I_a$ values, in the new $x_s, y_t$ matrix, $F(x_s-n, y_s-m)$ is the predetermined filter coefficients related to the previous calculated $I_a$ values for subareas in the new $x_s, y_t$ matrix, and n,m is the number of previous calculated $I_a$ values for subareas in the new $x_s, y_S$ matrix, in the X and Y direction, respectively.

This digital filter has the advantage that the filter coefficients for previous calculated values of $I_a$ can be smaller and smaller, thereby ensuring that the influence of errors in previous calculated values are minimized. Furthermore, these coefficients can easily change value dynamically, as high frequency components in the scene change from one part of the scene to another, thereby taking the full advantage of the method, where it is needed.

The method can by another advantageously embodiment according to the invention also be carried out in such a way that the scanning and the stepwise movement of the light sensor are asynchronous in relation to each other in the sense that each new scanning is taken place in a sensor position not scanned before whereby an almost infinite high resolution is possible by only scanning a sufficient number of times.

In another embodiment, the method can include a calibration procedure. The procedure can consist of steps to move the light sensor to a number of calibration positions by applying known energy values, in terms of current and voltage, to the at least one driver. At each calibration position a signal representing the incident light radiated from the scene can be obtained and a reference value representing the distance moved by the light sensor can be calculated by comparing the different numbers of known energy values with the different signals representing the incident light radiated from the scene. This calibration procedure can easily and quickly be performed at any time a user wishes or at regular interval of time set by a microprocessor. The procedure further have the advantage that it only uses hardware components already present in the embodiment and does not require additional components, such as movement sensors, which would add to the cost, energy consumption or size of the embodiment.

The invention also relates to an apparatus for performing the method according to the invention. This apparatus correspond in general to the known solid state imaging devices known by the skilled person but with the exception that the optical sensor is arranged in a flexible system comprising means for moving said sensor a predetermined or measurable area which are much less than each of the areas of each sensor element. When the sensor is arranged in a flexible system will the apparatus quickly and accurate be able to make new measurements and output values for each predetermined or measured position.

The apparatus can also comprise a computer provided with a software program for establishing a representation of the high resolution image by calculating the representation of the received incident light from the scene at each subarea. The light sensor can preferably be moved by means of an electromechanical device or a piezo-element, so that the position of the sensor-matrix can be controlled electrically, and thus the position synchronized to the storing and calculating electronic devices.

A further advantage of the invention, is that each set of output values from the sensor matrix can be transmitted or stored externally together with information about the exact position of the sensor array at the time of the scanning, for calculation in another place or time, for example after transmission through network or storing on digital media. This will give the advantage that no extra computer resources for calculation has to be included in the invented apparatus, but existing resources in the receiving devices can be used.

Referring now to the drawing figures, FIG. 1 shows a sensor cell 1 with 16 equally sized subareas a moved from a first scanning position 2 to a second scanning position 3. As can be seen there is T=6 overlapping subareas, which means that the total area N of the overlapping subareas is N=6*a while the entire sensor area A=16*a. That means that if the sensor is moved in such a way that the overlapping area only is increasing by the size a of a subarea during each scanning the resolution can as maximum be extended by the size A.

FIG. 2a illustrates how the original picture 4, consisting of two black squares 5 and two white squares 6, are being processed by the method according to the invention. The black squares are given the value 0 while the white squares are given the value 256, which are the normal value range used in computer and sensor systems. The sensor is having a cell-array 7 with 6 cells, and in the next line is seen how the sensor according to the invention is evaluating the image. Each cell is larger than each square in the image. The sensor will therefore not be able to see the correct image resolution. Since each cell only is able to see a number of squares, will each cell give a mean value from the squares. In this case is the first set of squares 5*a* and 6*a* and the second set of squares 5*b* and 6*b* each given the respective cells mean value of 128 (in the Figures. This is indicated by single-lined right inclined hatching). Therefore, image 8 would be the resulting image in case the image is not further processed.

FIG. 2*b* shows how the sensor is making a first scanning 9*a*, then moving the sensor in the X-direction with a step a, and thereafter making a second scanning 9*b*. The incoming output signals from the sensor cells is stored in the electronics attached to the sensor (directly or indirectly) as respectively a first and second set of signals based on each cells incoming light. The first set of output signal from the sensor is measured as respectively $V_o(1,1)$, $V_o(1,2)$, $V_o(1,3)$, $V_o(1,4)$, $V_o(1,5)$, $V_o(1,6)$, and the second set of output signals are measured as respectively $V_o(2,1)$, $V_o(2,2)$, $V_o(2,3)$, $V_o(2,4)$, $V_o(2,5)$, $V_o(2,6)$. The o stands for output, s for sensor, the numbers denotes the scan number and the cell number respectively. The new set of calculated $I_a$ light values are denoted respectively $I_a(1,1)$, $I_a(2,1)$, $I_a(1,2)$, $I_a(2,2)$, $I_a(1,3)$, $I_a(2,3)$, $I_a(1,4)$, $I_a(2,4)$, $I_a(1,5)$ $I_a(2,5)$, $I_a(1,6)$. The numbers in the brackets denotes the a value (=1 or 2) and the cell number in the original sensor matrix that it originates from, respectively.

The new picture, which is shown in FIG. 2*c*, is now calculated by means of the formula (3), as the subareas are equally sized.

$$I_a(z) = V_o * N - \Sigma I_a(n) \text{ for } n=1 \text{ to } n=N, a \neq z$$

where:
N is the number of subareas into which each cell is split,
n is the index for subareas in the sensor cell,
a is the area of a subarea of the sensor cell,
$V_o$ is the output signals from the sensor cells,
$I_a$ is the computed light radiation received by the subarea a,
z is the subarea to be used for calculation, and
A is the area of the sensor cell.

The resolution enhancement factor is in the present case 2, and for each cell is there a overlapping area T of 1.

$$I_a(1,1) = V_o(1,1) * 2 - \Sigma I_a(a)$$

in this specific case is $\Sigma I_a(a)$ not known, as no values has been previously calculated, why an estimate is given, e.g. the mean value of the starting cell, that is $\Sigma I_a(a) = V_o(1,1)$, therefore:

$$I_a(1,1) = V_o(1,1)*2 - V_o(1,1) = 256*2 - 256 = 256$$

$$I_a(2,1) = V_o(2,1)*2 - I_a(1,1) = 256*2 - 256 = 256$$

$$I_a(1,2) = V_o(1,2)*2 - I_a(2,1) = 256*2 - 256 = 256$$

$$I_a(2,2) = V_o(2,2)*2 - I_a(1,2) = 128*2 - 256 = 0$$

$$I_a(1,3) = V_o(1,3)*2 - I_a(2,2) = 128*2 - 0 = 256$$

$$I_a(2,3) = V_o(2,3)*2 - I_a(1,3) = 128*2 - 256 = 0$$

$$I_a(1,4) = V_o(1,4)*2 - I_a(2,3) = 128*2 - 0 = 256$$

$$I_a(2,4) = V_o(2,4)*2 - I_a(1,4) = 256*2 - 256 = 256$$

$$I_a(1,5) = V_o(1,5)*2 - I_a(2,4) = 256*2 - 256 = 256$$

$$I_a(2,5) = V_o(2,5)*2 - I_a(1,5) = 256*2 - 256 = 256$$

$$I_a(1,6) = V_o(1,6)*2 - I_a(2,5) = 256*2 - 256 = 256$$

FIG. 3 shows how the method according to the invention is operation in case each sensor cell is not abutting on the next sensor cell. The image seen in FIG. 3*a* is the same image as that seen in FIG. 2*a*, however the sensor cells 7 are seeing the image differently as there is a space b between the cells. Therefore, image 10 would be the resulting image in case the image is not further processed.

FIG. 3*b* shows how the space can be covered by three scannings, because the distance between two cells is exactly half the width of a cell. The resulting resolution enhancement will in this case not be equal to N (which is two) as the scannings cover an area which where not covered by the sensor matrix, thereby giving a resolution enhancement of 3. The sensor is making a first scanning 10*a*, then moving the sensor in the X-direction with a step a, and thereafter making a second scanning 10*b*, moving the sensor in the X-direction with step a and making a third scanning 10*c*. The incoming input signals is stored in the sensor electronics attached to the sensor directly or indirectly as respectively a first, a second and a third set of signals based on each cells incoming light.

The first set of output signal from the sensor is measured as respectively $V_o(1,1)$, $V_o(1,2)$, $V_o(1,3)$, $V_o(1,4)$, $V_o(1,5)$, $V_o(1,6)$, and the second set of output signals are measured as respectively $V_o(2,11)$, $V_o(2,2)$, $V_o(2,3)$, $V_o(2,4)$, $V_o(2,5)$, $V_{os}(2,6)$ and the third set of output signals are measured as respectively $V_o(3,11)$, $V_o(3,2)$, $V_o(3,3)$, $V_o(3,4)$ $V_o(3,5)$, $V_o(3,6)$. The o stands for output, the numbers denotes the scan number and the cell number respectively. A third number would have to be introduced in case of a sensor matrix with more than one row.

The new set of calculated $I_a$ light values are denoted respectively $I_a(1,1)$, $I_a(2,1)$, $I_a(3,1)$, $I_a(1,2)$, $I_a(2,2)$, $I_a(3,2)$, $I_a(1,3)$, $I_a(2,3)$, $I_a(3,3)$, $I_a(1,4)$, $I_a(2,4)$, $I_a(3,4)$, $I_a(1,5)$, $I_a(2,5)$, $I_a(3,5)$ $I_a(1,6)$. The numbers in the brackets denotes the n value (=1, 2 or 3) and the cell number in the original sensor matrix that it originates from, respectively. A third number would have to be introduced in case of a sensor matrix with more than one row.

The new picture, which is shown in FIG. 3*c*, is now calculated by means of the formula (3) as the subareas of the sensor cell are equally sized.

$$I_a(z) = V_o * N - \Sigma I_a(n) \text{ for } n=1 \text{ to } n=N, a \neq z$$

where:
N is the number of subareas into which each cell is split,
n is the index for subareas in the sensor cell,
a is the area of a subarea of the sensor cell,
$V_o$ is the output signals from the sensor cells,
$I_a$ is the computed light radiation received by the subarea a,
z is the subarea to be used for calculation, and
A is the area of the sensor cell.

$$I_a(1,1) = V_o(1,1)*2 - V_o(1,1) = 256*2 - 256 = 256 \text{ (White)}$$

$$I_a(2,1) = V_o(2,1)*2 - I_a(1,1) = 256*2 - 256 = 256 \text{ (White)}$$

$$I_a(3,1) = V_o(3,1)*2 - I_a(2,1) = 256*2 - 256 = 256 \text{ (White)}$$

$$I_a(1,2) = V_o(1,2)*2 - I_a(3,1) = 256*2 - 256 = 256 \text{ (White)}$$

Same values until $I_a(1,3)$:

$$I_a(1,3) = V_o(1,3)*2 - I_a(3,2) = 128*2 - 256 = 0 \quad \text{(Black)}$$

$$I_a(2,3) = V_o(2,3)*2 - I_a(1,3) = 128*2 - 0 = 256 \quad \text{(White)}$$

-continued $I_a(3, 3) = V_o(3, 3) * 2 - I_a(2, 3) = 128 * 2 - 256 = 0$ (Black)

$I_a(1, 4) = V_o(1, 4) * 2 - I_a(3, 3) = 128 * 2 - 0 = 256$ (White)

$I_a(2, 4) = V_o(2, 4) * 2 - I_a(1, 4) = 256 * 2 - 256 = 256$ (White)

$I_a(3, 4) = V_o(3, 4) * 2 - I_a(2, 4) = 256 * 2 - 256 = 256$ (White)

⋮

$I_a(3, 5) = V_o(3, 5) * 2 - I_a(2, 5) = 256 * 2 - 256 = 256$ (White)

In both cases, an estimate of the initial value of $I_a(1,1)$ is made. In case this estimate is wrong or contains an error, the mistake will propagate throughout the calculations. FIG. 4 shows how one embodiment of the digital filter according to the invention is used for correcting an error. The original picture 11 in (4) has a grey background (in the figs. indicated by single-lined right inclined hatching) with value 128 and two grey dots (12a,12b) with value 64 (this is indicated in the Figures by small cross-hatching). With one scan 13 the resulting picture would be 14. According to the invention two scans 15a,15b are used in this example to double the resolution, A=2. The sensor cells measure the grey background correctly with values 128, but the output $V_o(2,2)$ (output from scan 2, sensor cell 2) is due to a distortion or other error, measured as 80 instead of 96, which would be the correct value. This will cause all the calculated new values after $I_a(1,2)$ to be incorrect 16, which can be seen by the following calculation:

$I_a(1,1) = V_o(1,1)*2 - V_o(1,1) = 128*2 - 128 = 128$ (Estimated initial value)

$I_a(2,1) = V_o(2,1)*2 - I_a(1,1) = 128*2 - 128 = 128$ $I_a(1,2) = V_o(1,2)*2 - I_a(2,1) = 128*2 - 128 = 128$ $I_a(2,2) = V_o(2,2)*2 - I_a(1,2) = 80*2 - 128 = 32$ $I_a(1,3) = V_o(1,3)*2 - I_a(2,2) = 96*2 - 32 = 160$ $I_a(2,3) = V_o(2,3)*2 - I_a(1,3) = 96*2 - 160 = 32$ $I_a(1,4) = V_o(1,4)*2 - I_a(2,3) = 96*2 - 32 = 160$ $I_a(2,4) = V_o(2,4)*2 - I_a(1,4) = 128*2 - 160 = 96$ $I_a(1,5) = V_o(1,5)*2 - I_a(2,4) = 96*2 - 32 = 160$ $I_a(2,5) = V_o(2,5)*2 - I_a(1,5) = 128*2 - 160 = 96$ $I_a(1,6) = V_o(1,6)*2 - I_a(2,5) = 96*2 - 32 = 160$

It is obvious that the error introduced in $V_o(2,2)$ will influence all the following calculations, and will cause an oscillation even when $V_o$ has stopped changing. This is shown in the resulting picture 16a. In the calculations of the $I_a$ values in 16b a very simple digital filter according to (4) has been introduced. This digital filter has the advantage that it can use more values from previous measured and/or calculated cells to calculate new $I_a$ values, thereby minimizing the influence of noise and other errors:

The filter coefficients are chosen to:
Fv=2
F(−1,0)=0.75
F(−2,0)=0.25 (only one row in the sensor matrix)

All other coefficients in (4) are set to 0.

$I_a(1, 1) = V_o(1, 1) * 2 - V_o(1, 1)$ $= 128 * 2 - 128$ $= 128$ (Estimated initial value)

$I_a(2, 1) = V_o(2, 1) * 2 - 0.75 * I_a(1, 1) - 0.25 * I_a(1, 1)$ $= 2 * 128 - 0.75 * 128 + 0.25 * 128$ $= 128$ ($I_a(1,1)$ are used two times, as no present value exist)

$I_a(1, 2) = V_o(1, 2) * 2 - 0.75 * I_a(2, 1) - 0.25 * I_a(1, 1)$ $= 2 * 128 - 0.75 * 128 + 0.25 * 128$ $= 128$ $I_a(2, 2) = V_o(2, 2) * 2 - 0.75 * I_a(1, 2) - 0.25 * I_a(2, 1)$ $= 2 * 80 - 0.75 * I_a(1, 2) - 0.25 * I_a(2, 1)$ $= 32$ $I_a(1, 3) = V_o(1, 3) * 2 - 0.75 * I_a(2, 2) - 0.25 * I_a(1, 2)$ $= 2 * 96 - 0.75 * 32 + 0.25 * 128$ $= 136$ $I_a(2, 3) = V_o(2, 3) * 2 - 0.75 * I_a(1, 3) - 0.25 * I_a(2, 2)$ $= 2 * 96 - 0.75 * 136 + 0.25 * 32$ $= 82$ $I_a(1, 4) = V_o(1, 4) * 2 - 0.75 * I_a(2, 3) - 0.25 * I_a(1, 3)$ $= 2 * 96 - 0.75 * 82 + 0.25 * 136$ $= 96.5$ $I_a(2, 4) = V_o(2, 4) * 2 - 0.75 * I_a(1, 4) - 0.25 * I_a(2, 3)$ $= 2 * 128 - 0.75 * 96.5 + 0.25 * 82$ $= 163$ $I_a(1, 5) = V_o(1, 5) * 2 - 0.75 * I_a(2, 4) - 0.25 * I_a(1, 4)$ $= 2 * 128 - 0.75 * 163 + 0.25 * 96.5$ $= 109.5$ $I_a(2, 5) = V_o(2, 5) * 2 - 0.75 * I_a(1, 5) - 0.25 * I_a(2, 4)$ $= 2 * 128 - 0.75 * 109.5 + 0.25 * 163$ $= 133$ $I_a(1, 6) = V_o(1, 6) * 2 - 0.75 * I_a(2, 5) - 0.25 * I_a(1, 5)$ $= 2 * 128 - 0.75 * 109.5 + 0.25 * 163$ $= 129$

In FIG. 4, the different values in accordance with the calculation above are indicated by means of different types of hatching. As can be seen from this example, the error introduced in the measurement of cell $V_o(2,2)$ will not cause oscillations in the following calculations and the influence will disappear. The resulting picture can be seen in 16b.

FIG. 5 illustrates in form of an apparatus 17 by way of example the basic principle for using the invention in a web camera. The apparatus 17 comprises a light sensor 18 with a number of cells 19 formed as a matrix. The sensor serves for receiving incident light radiated from a scene (not shown). The light sensor is movable mounted on a frame 20. Two drivers 21 are furthermore arranged for cyclically moving the light sensor along the frame in a X and Y direction.

The drivers could e.g. be a piezo-element or an electro-mechanical device. Each driver is associated with a position sensor 22 for recording the immediate position of the light sensor relative to the frame and for generating output representing said position.

A computer 23 serves for receiving the generated output from the position sensors and for, by means of a software program, calculating control values which via a circuit 24 is send to the two position drivers 21 for bringing these to drive the light sensor 18 in such a way that the steps of movement as function of the scannings defines a predetermined curve in a coordinate system.

The apparatus functions in principle in the way described above with reference to FIGS. 1-16. In particular, the light sensor 18 is cyclically brought to scan the scene (not shown) by means of an activator (not shown) for a number of times. Simultaneously with the scanning the light sensor is step-wise moved an identical number of times along the frame in the X-Y direction while defining a number of subareas, whereby the total distance covered during said movements of the light sensor corresponds to the extend of the cell and the distance to the next cell in the X-Y direction, respectively. During the operation of the apparatus output representing the received incident light from the scene at each sensor cell is send from the light sensor 18 to the computer 23 via another circuit 25, which is shown in bold line.

By storing the received output from the light sensor and adding information about the position of the sensor at the time of scanning by means of another software program, the computer can transmit the pictures and added information to another computer (not shown) by means of the circuit 26 which can be any kind of wired or wireless connection or network. The receiving computer at the other end of the network can then establish a representation of the high resolution picture by calculating the representation of the received incident light from the scene at each subarea.

The adding of information about the position together with the images, can be done in several ways. However, to avoid destroying the information when converting images from one file format to another, the information about the position of the sensor 18 at the time of scanning of the scene (not shown) is coded directly into the image by means of a software program in the embedded computer 25. The program advantageously uses some of the pixels in the scanned image and substitutes these with information about the position. The missing pixels will at the time of displaying be substituted with picture information by means of another software program. This can be done by means of different known interpolating software algorithms known by persons skilled in image processing.

By this method, the information about the position of the sensor 18 will be consistent in the picture, even if transformation to other file formats takes place before the calculation of high-resolution pictures.

The calculated representation of the high resolution picture can then be shown on different kind of displaying devices as computer screens and projectors.

The above mentioned curve which is showing the steps of movement as function of the scannings in a coordinate system can within the scope of the invention in itself have any suitable form. In the following advantages and drawbacks of some representative curves are mentioned.

In FIGS. 6a and 6b a simple principle for moving a light sensor 26 is illustrated, which in this case is only moved in the Y-direction. It is, however, obvious that the movement as well could be in the X-direction. FIG. 6b shows a coordinate system where the time of scanning is shown on the axis of abscissas and the position of the light sensor on the axis of ordinate. The scannings are performed with equidistant time intervals and the distance between each position of the light sensor 26 is identical to these intervals. Thereby the movement of the light sensor as function of the scannings needs to precisely follow a triangle curve as shown in FIG. 6b.

FIG. 7a illustrates a sensor matrix 27 moved in the diagonal direction, which is simple to control merely mechanical since the movements only take place in one direction. The subsequent calculations are, on the other hand, relatively complicated as the subareas are having different sizes, which need to be converted by means of interpolation to equal quadratic pixels elements before being able to show the high resolution picture on e.g. a television screen.

As shown in FIG. 7b, the scanning positions are asynchronous with scanning times. That means that each new scanning is taken place in a matrix position not scanned before whereby an almost infinite high resolution is possible by only scanning a sufficient number of times. The distances between the positions of the sensor matrix and the scanning times, respectively, are as in the example shown in FIGS. 6a and 6b equidistant thereby requiring that the curve shown in FIG. 7b must be a triangle.

In FIG. 8a, the sensor matrix 28 is carrying out free oscillations which is the most simple way for mechanically moving the sensor. The oscillations shall, however, still be controlled in such a way that they are kept within the wanted limitations. FIG. 8b shows a situation where the distance between the scannings is equal in time whereby the distances between the positions of the sensor matrix 28 will be different resulting in complicated subsequent calculations and reduced precision of this calculations.

FIGS. 9a and 9b show the same as in FIGS. 8a and 8b, with the only difference being that the distances between the positions of the sensor matrix now are constant whereas the distance in time between the scannings is varying. This mode of using the invention requires in many cases a picture buffer as most receivers, such as computers or servers or the like will require that the pictures arrives with equal distances in time.

FIGS. 10a, 10b and 10c illustrate the invention used in a scanner. In a scanner a sensor matrix having three arrays usually is used. Each array having a red (R), green (G) or blue (B) filter. All colors are scanned in one scan (single pass) while a step motor is moving the three arrays over the object to be scanned.

Some scanners are using only one array. In this case will the filter be changed between each scan, i.e., that the array shall pass the object three times (a multipass process). The resolution in a scanner depends upon the number of elements in the array and the precision of movement of the arrays. Typically, the resolution in the movement direction of the array will be the double the resolution in the direction of the array itself, conventionally 300×600 dpi or 600×1200 dpi. The distances between each pixel cause this, which typically is in the same order of magnitude as the pixel itself, whereby a higher resolution is possible in the Y-direction where the step motors can move in steps of precisely one pixel.

Figure 10:
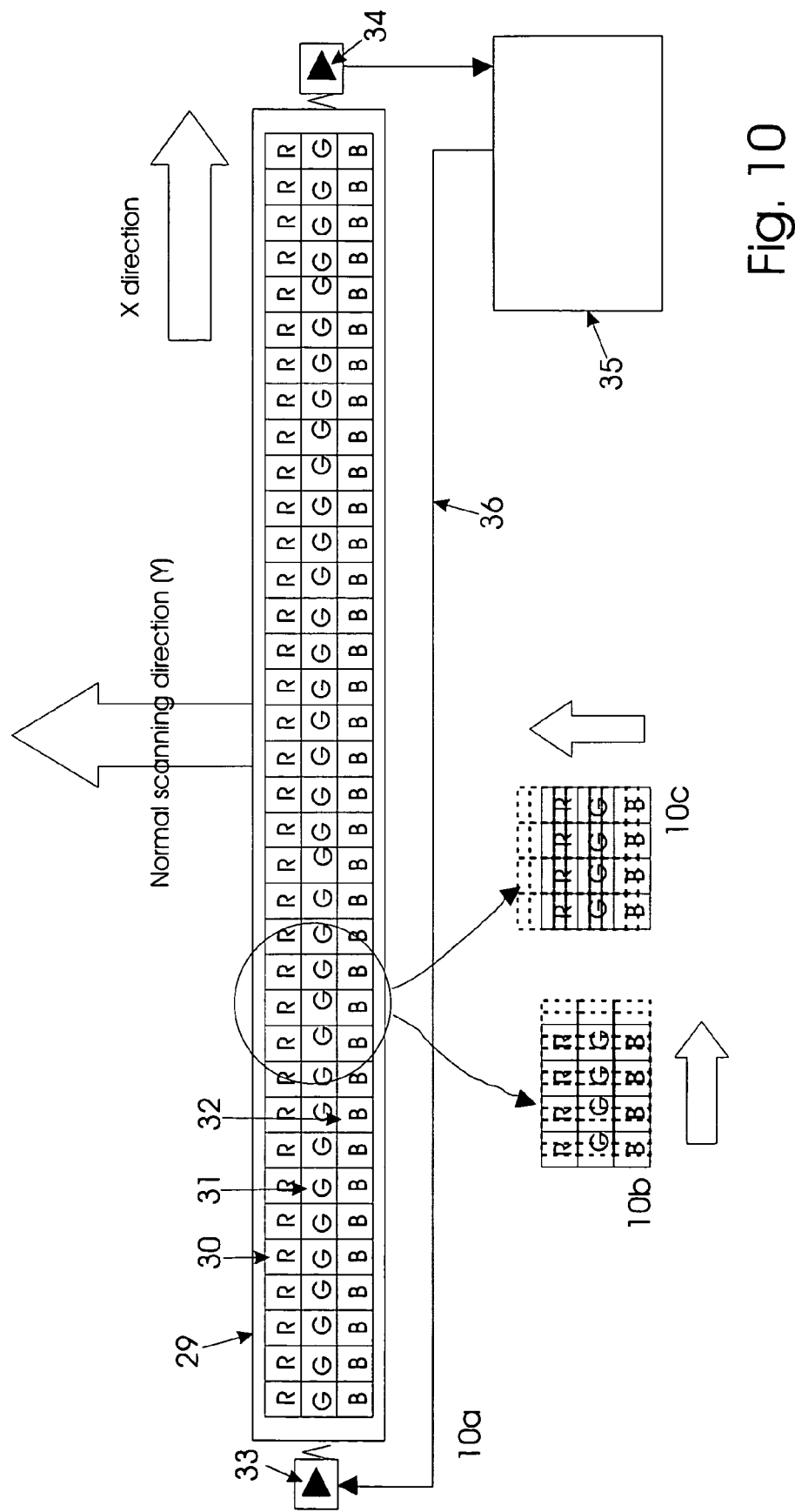

By using the invention in a scanner, the size of the pixel will not any more be the restricting factor as the array can be moved in the X-direction by means of an arrangement similar to the arrangement shown in FIG. 6a. The movement in the Y-direction can be carried out by means of a step motor, but in even smaller steps independent of the size of the pixels whereby the wanted resolution can be obtained. This arrangement is shown in FIG. 10 showing a scanner 29 having three arrays 30, 31 and 32 of cells R (red), G (green) and B (blue).

One driver 33 is typically arranged for cyclically moving the arrays in the X-direction. The driver is associated with a position sensor 34 for recording the immediate position of the light sensor in the X-direction and for generating output representing said position.

A computer 35 serves for receiving the generated output from the position sensors and for, by means of a software program, calculating control values which via a circuit 36 is send to the position driver 33 for bringing this to drive the three arrays cyclically in a wanted mode along the X-axis as illustrated in FIG. 10b, while the three arrays is moved along the Y-axes by means of a stepmotor as illustrated in FIG. 10c.

FIG. 11 shows another advantageous embodiment of the apparatus according to the invention. The apparatus comprise a light sensor 18 with a number of cells 19 formed as a matrix. The sensor serves for receiving light radiated from a scene (not shown). The light sensor is mounted on a sensor frame 20, such as a printed circuit board or similar. The frame is further movably mounted on a base frame 37, such as a circuit board or similar, by means of a resilient mountings 38, such as rubber suspensions, springs or the like.

Two drivers, implemented as coils 39, are rigidly mounted on the base frame, and corresponding anchoring means 40, which for example consist of a ferromagnetic material which is mounted on the sensor frame, which sensor frame is moveable, is mounted on the base frame. When applying electrical energy, in terms of current and voltage, to these coils 39 a magnetic field will be induced, which will attract the anchors 40 mounted on the sensor frame, thereby moving the sensor frame in the x respective y direction, where the distance moved will be dependent on the amount of electrical energy applied to the individual coil 39.

An embedded computer 23 serves for, by means of a software program to calculate control values in terms of current and voltages which via a third circuit 41 is sent to the two coils 39 bringing these to move the light sensor 18 mounted on the sensor frame 37 in steps, where a predetermined curve in a coordinate system is defined by the steps as a function of the scanning.

The steps is measured with a precision of microns, it is therefore necessary to be able to move the sensor very precisely in fractions of the size of the individual sensor elements, or to obtain precise information about the position of the sensor. In the present invention the precise movement of the apparatus is achieved by measuring the position of the sensor frame 20 and thereby the sensor 18 at different predetermined sets of the applied values of current and voltage. This is usually only done once in a calibration procedure.

The embedded computer 23 applies a number of known values of energy, in terms of current and voltage to the coils 39, which will move the sensor frame in an equal number of displacement positions. For each applied value of energy the displacement of the sensor frame is compared to a reference position, which is the position of the sensor frame where no energy is applied. Each value of energy is measured and stored in the embedded computer 23. The measurement of the displacement is done by means of the sensor 18. For each new value of energy applied to the coils, a signal representing the scene (not shown) obtained by the sensor 18 is sent to the embedded computer 23 through a fourth circuit 42.

The embedded computer stores every representation of the scene and the matching energy value. Alternatively the embedded computer sends the representation and matching energy values to be stored in an external computer 43, which is connected to the embedded computer 23 through any kind of network 44. By means of a software program the embedded computer 23 or the external computer 43 analyses and compare the different representations of the scene obtained by the sensor 18 in the different positions. The program then calculate how many pixels the sensor frame 20 have moved by comparing different values of applied energy to the coils 39 with the different signals representing the scene (not shown), thus finding the displacement of the sensor frame 20 and the sensor 18, thereby enabling the embedded computer 23 to move the sensor frame 20 and thereby the sensor 18 any predetermined distance after the calibration procedure has taken place. Normally this calibration procedure only needs to take place once.

What is claimed is:

1. A method for converting a low resolution first image produced by a light sensor for receiving incident light radiated from a scene to a high resolution second image, whereby the light sensor is constructed as an array or matrix having a number of cells with each cell defining a predetermined area, which method comprises:

cyclically scanning the first image a number of times;

simultaneously moving the light sensor with the scanning stepwise an identical number of times relative to the light radiating scene in at least one direction thereby defining a number of subareas, such that the total distance covered during movement of the light sensor corresponds to the extent of the cell or to the extent of the cell plus a distance defined by or to a neighbor cell in the at least one movement direction, and establishing a representation of the high-resolution second image by calculating the representation of the received incident light from the scene at each subarea;

wherein the light sensor is moved a distance in each step corresponding to the extent of the area covered by the cell in the direction of movement or to the extent of the area covered by the cell in the direction of movement plus a distance defined by or to the neighbor cell in the direction of movement, divided by the number of scanning times.

2. The method of claim 1, wherein the light sensor is moved asynchronously with the scannings.

3. The method of claim 1, wherein the high resolution second image is computed by calculating the value for each subarea by means of the formula:

$$I_a(z) = V_0 * A/a(z) - \Sigma I_a(n) \text{ for } n=1 \text{ to } n=N, n \neq z$$

where

N = the number of subareas into which each cell is split,
n = the index for subareas in the sensor cell,
a = the area of a subarea of the sensor cell,
$V_0$ = the output signals from the sensor cells,
$I_a$ = the computed light radiation received by the subarea a,
z = the subarea to be used for calculation, and
A = the area of the sensor cell.

4. The method of claim 3, which further comprises calibrating the method by:
moving the light sensor to a number of calibration positions by applying known energy values to the at least one driver,
obtaining a signal representing the incident light radiated from the scene at each calibration position, and
calculating a reference value representing the distance of the movement of the light sensor by comparing the different numbers of known energy values with the different signals representing the incident light radiated from the scene.

5. The method of claim 1, which further comprises:
stepwise moving the light sensor by means of at least one driver relative to the light radiating scene,
recording the immediate position of the light sensor by at least one position sensor generating output representing the said sensor position,
sending the output to a computer having a software program for calculating control values on basis of the received output, and
sending signals representing the calculated control values to the at least one position driver for bringing this to drive the light sensor in such a way that the steps of movement as function of the scannings defines a predetermined curve.

6. The method of claim 1, wherein the light sensor is moved in a system of x-y coordinates and moved at least in one of the x-y directions of this system or in the direction of a cell of the light sensor.

7. The method of claim 1, which further comprises minimizing the influence of errors in previous calculated or estimated values by means of a digital filter.

8. The method of claim 7, wherein the digital filter uses several values from several cycles to compute a filter output value by the following formula $$I_a(nX_A,mY_A)=(F_{1,1})*V_o(p_{(1)}X,q_{(1)}Y)-(F_{2,2})*V_o(p_{(2)}X,q_{(2)}Y)-(F_{3,3})*\ldots-(F_{A,A})*V_o(p_{(A)}X,q_{(A)}Y)-(G_{-1,-0})*I_a(n_{-1}X_A,m_{-0}Y_A)-(G_{-0,-1})*I_a(n_0X_A,m_{-1}Y_A)-(G_{-1,-1})*I_a(n_{-1}X_A,m_{-1}Y_A)\ldots-(G_{-n,-m})*I_a(n_{-n}X_A,m_{-m}Y_A),$$

where:

$I_a(nX_A,mY_A)$ is the light radiation value of the n,m'th element in the new $X_A,Y_A$ matrix to be calculated, $I_a(n_{-1}X_A,m_{-0}Y_A)$ is the previous calculated element of the n−1,m'th element of the new $X_A,Y_A$ matrix, $(G_{-1,-0})$ is the belonging predetermined filter value, $I_a(n_{-0}X_A,m_{-1}Y_A)$ is the previous calculated element of the n,m−1'th element of the new $X_A,Y_A$ matrix, $(G_{-0,-1})$ is the belonging predetermined filter value, $I_a(n_{-n}X_A,m_{-m}Y_A)$ is the previous calculated element of the n−n,31 m'th element of the new $X_A,Y_A$ matrix, $(G_{-n,-m})$ is the belonging predetermined filter value, $V_o(p_{(1)}X,q_{(1)}Y)$ is the measured and stored output value of the p, q'th element in the physical sensor matrix overlapping the n,m'th element in the new calculated $X_A, Y_A$ matrix from the first position, $(F_{1,1})$ is the belonging predetermined filter value, p,q are calculated from n/A and m/A, $V_o(p_{(A)}X,q_{(A)}Y)$ is the measured and stored output value of the p,q'th element in the physical sensor matrix overlapping the n,m'th element in the new calculated $X_A,Y_A$ matrix from the A'th position, $(F_{A,A})$ is the belonging predetermined filter value, and p,q are calculated from n/A and m/A.

9. A method for converting a low resolution first image produced by a light sensor for receiving incident light radiated from a scene to a high resolution second image, whereby the light sensor is constructed as an array or matrix having a number of cells with each cell defining a predetermined area, which method comprises:
cyclically scanning the first image a number of times;
simultaneously moving the light sensor with the scanning stepwise an identical number of times relative to the light radiating scene in at least one direction thereby defining a number of subareas, such that the total distance covered during movement of the light sensor corresponds to the extent of the cell or to the extent of the cell plus a distance defined by or to a neighbor cell in the at least one movement direction, and
establishing a representation of the high-resolution second image by calculating the representation of the received incident light from the scene at each subarea,
wherein the light sensor is moved a distance for each step corresponding to the extent of the area covered by the cell plus a distance defined by or to the neighbor cell minus the extent of the area of the smallest subarea to be calculated in the direction of movement, divided with the number of scanning times.

10. A method for converting a low resolution first image produced by a light sensor for receiving incident light radiated from a scene to a high resolution second image, whereby the light sensor is constructed as an array or matrix having a number of cells with each cell defining a predetermined area, which method comprises:
cyclically scanning the first image a number of times;
simultaneously moving the light sensor with the scanning stepwise an identical number of times relative to the light radiating scene in at least one direction thereby defining a number of subareas, such that the total distance covered during movement of the light sensor corresponds to the extent of the cell or to the extent of the cell plus a distance defined by or to a neighbor cell in the at least one movement direction, and
establishing a representation of the high-resolution second image by calculating the representation of the received incident light from the scene at each subarea,
wherein incident light received from the scene is represented as a number of pixels at each subarea, and the method further comprises substituting at least some of the pixels with information of the position of the light sensor mounted on a sensor frame, thereby providing an identifiable coding of the position of the light sensor mourned on the sensor frame as a low resolution first image.

11. An apparatus for converting a low resolution first image to a high resolution second image, comprising:
a light sensor for receiving incident light radiated from a scene to a high resolution second image, whereby the light sensor is constructed as an array or matrix having a number of cells, with each cell defining a predetermined area;
means for bringing the apparatus cyclically to scan the first image a number of times by means of the light sensor;
means for moving the light sensor simultaneously with the scanning stepwise by an identical number of times relative to the light radiating scene in at least one direction of movement, whereby the total distance covered during the movement of the light sensor corresponds to the extent of the area covered by the cell in the direction of movement or to the extent of the area covered by the cell in the direction of movement plus a distance defined by or to a neighbor cell in the direction of movement, divided by the number of scanning times in order to define a number of subareas, and means for establishing a representation of a high resolution second image by calculating the representation of the received incident light from the scene at each subarea.

12. An apparatus for converting a low resolution first image to a high resolution second image, comprising:

a light sensor for receiving incident light radiated from a scene to a high resolution second image, whereby the light sensor is constructed as an array or matrix having a number of cells, with each cell defining a predetermined area;

a frame for movably mounting the light sensor;

an activator for bringing the apparatus cyclically to scan a low resolution first image a number of times by means of the sensor;

at least one driver for simultaneously moving the light sensor with the scanning stepwise an identical number of times relative to the light radiating scene in at least one direction, whereby the total distance covered during the movement of the light sensor corresponds to the extent of the cell or to the extent of the cell plus a distance defined by or to a neighbor cell in the at least one movement direction to define a number of subareas; and at least one position sensor for recording the immediate position of the light sensor relative to the frame and sending output representing the position to a computer having a software program for calculating control values on basis of the received output and sending signals representing the calculated control values to the at least one position driver for bringing this to drive the light sensor in such a way that the steps of movement as function of the scannings defines a predetermined curve in a coordinate system, wherein a representation of the high resolution second image is established by calculating the representation of the received incident light from the scene at each subarea by means of the formula:

$$I_a(z) = V_0 * A/a(z) - \Sigma I_a(n) \text{ for } n=1 \text{ to } n=N, n \neq z$$

where
N=the number of subareas into which each cell is split,
n=the index for subareas in the light sensor cell,
a=the area of a subarea of the light sensor cell,
$V_0$=the output signals from the light sensor cells,
$I_a$=the computed light radiation received by the subarea a,
z=the subarea to be used for calculation, and
A=the area of the light sensor cell.

13. The apparatus of claim 12, which further comprises a digital filter arranged for minimizing the influence of at least one error in the value.

14. The apparatus of claim 13, wherein the digital filter uses several values from several cycles to compute a filter output value by the following formula $$I_a(nX_A, mY_A) = (F_{1,1}) * V_0(p_{(1)}X, q_{(1)}Y) - (F_{2,2}) * V_0(p_{(2)}X, q_{(2)}Y) - (F_{3,3}) * \ldots - (F_{A,A}) * V_0(p_{(A)}X, q_{(A)}Y) - (G_{-1,-0}) * 1_a(n_{-1}X_A, m_{-0}Y_A) - (G_{-0,-1}) * I_a(n_0 X_A, m_{-1}Y_A) - (G_{-1,-1}) * 1a(n_{-1}X_A, m_{-1}Y_A) \ldots - (G_{-n,-m}) * 1_a(n_{-n}X_A, m_{-m}Y_A),$$

where, $I_a(nX_A, mY_A)$ is the light radiation value of the n,m'th element in the new $X_A$, $Y_A$ matrix to be calculated, $I_a(n_{-1}X_A, m_{-0}Y_A)$ is the previous calculated element of the n-1,m'th element of the new $X_A$, $Y_A$ matrix, $(G_{-1,-0})$ is the belonging predetermined filter value, $I_a(n_{-0}X_A, m_{-1}Y_A)$ is the previous calculated element of the n,m-1'th element of the new $X_A$, $Y_A$ matrix, $(G_{-0,-1})$ is the belonging predetermined filter value, $I_a(n_{-n}X_A, m_{-m}Y_A)$ is the previous calculated element of the n-n, m-m'th element of the new $X_A$, $Y_A$ matrix, $(G_{-n,-m})$ is the belonging predetermined filter value, $V_0(p_{(1)}X, q_{(1)}Y)$ is the measured and stored output value of the p,q'th element in the physical sensor matrix overlapping the n,m'th element in the new calculated $X_A, Y_A$ matrix from the first position, $(F_{1,1})$ is the belonging predetermined filter value, p,q are calculated from n/A and m/A, $V_0(p_{(A)}X, q_{(A)}Y)$ is the measured and stored output value of the p,q'th element in the physical sensor matrix overlapping the n,m'th element in the new calculated $X_A, Y_A$ matrix from the A'th position, and $(F_{A,A})$ is the belonging predetermined filter value, and p,q are calculated from n/A and m/A.

15. The apparatus of claim 12, wherein the computer is provided with a software program for establishing a representation of the high resolution image by calculating the representation of the received incident light from the scene at each subarea.

16. The apparatus of claim 12, wherein the at least one driver is an electromechanical device or a piezoelectric-element.

17. The apparatus of claim 13, wherein the at least one driver comprises a coil rigidly mounted on a base frame and an anchoring means mounted on the sensor frame, with the sensor frame being moveably mounted on the base frame, and the anchoring means being actuated by an attractive force induced by the coil, thereby pulling the anchor toward the coil.

* * * * *

UNITED STATES PATENT AND TRADEMARK OFFICE
CERTIFICATE OF CORRECTION

PATENT NO. : 7,327,388 B2 Page 1 of 1
APPLICATION NO. : 10/797375
DATED : February 5, 2008
INVENTOR(S) : Andersen It is certified that error appears in the above-identified patent and that said Letters Patent is hereby corrected as shown below:

Title Page:
Item (57) ABSTRACT, line 3, after "apparatus" delete "is".

Column 15:
Line 38 (claim 8, line 1 of the formula), change each occurrence of "$V_o$" to -- $V_0$ --.
Line 39 (claim 8, line 2 of the formula), after "$X_{,q(2)}Y)-(F_{3,3})$*", begin a new paragraph.
Line 40 (claim 8, line 3 of the formula), after "$(G_{-1,-0})*I_a(n_{-1}X_A,m_{-0}Y_A)-(G_{-0,-1})$", begin a new paragraph.
Line 41 (claim 8, line 4 of the formula), after "$X_A,m_{-1}Y_A)-(G_{-1,-1})*I_a(n_{-1}X_A,m_{-1}Y_A)$", begin a new paragraph.
Line 53 (claim 8, line 19), change "n-n,31 m'th" to -- n-n,m-m'th --.

Column 16:
Line 49 (claim 10, line 25), change "mourned" to -- mounted --.

Column 18:
Line 8 (claim 14, line 2 of the formula), after "$X_{,q(2)}Y)-(F_{3,3})$*", begin a new paragraph.
Line 9 (claim 14, line 3 of the formula), after "$(G_{-1,-0})*I_a(n_{-1}X_A,m_{-0}Y_A)-(G_{-0,-1})$", begin a new paragraph.
Line 10 (claim 14, line 4 of the formula), after "$X_A,m_{-1}Y_A)-(G_{-1,-1})*I_a(n_{-1}X_A,m_{-1}Y_A)$", begin a new paragraph.
Line 45 (claim 17, line 1), after "claim", change "13" to -- 12 --.

Signed and Sealed this

Twentieth Day of May, 2008

JON W. DUDAS
*Director of the United States Patent and Trademark Office*